United States Patent [19]

Kitamoto et al.

[11] Patent Number: 4,515,857
[45] Date of Patent: May 7, 1985

[54] MAGNETIC RECORDING MEDIUM

[75] Inventors: Tatsuji Kitamoto; Goro Akashi, both of Odawara, Japan

[73] Assignee: Fuji Photo Film Co., Ltd., Minami-Ashigara, Japan

[21] Appl. No.: 375,690

[22] Filed: May 6, 1982

[30] Foreign Application Priority Data

May 7, 1981 [JP] Japan .................................. 56-67640

[51] Int. Cl.³ ........................... G11B 5/70; B32B 5/30
[52] U.S. Cl. .................................. 428/328; 252/62.54;
360/134; 360/135; 360/136; 427/128; 427/131;
427/132; 428/329; 428/336; 428/694; 428/900
[58] Field of Search ....................... 427/131, 132, 128;
428/693, 692, 694, 900, 336, 328, 329;
360/134–136; 252/62.54

[56] References Cited

U.S. PATENT DOCUMENTS

| | | | |
|---|---|---|---|
| 3,052,567 | 9/1962 | Gabor | 360/134 |
| 3,185,775 | 3/1965 | Camras | 360/134 |
| 4,255,492 | 3/1981 | Audran | 428/694 |

*Primary Examiner*—Ellis P. Robinson
*Attorney, Agent, or Firm*—Armstrong, Nikaido, Marmelstein & Kubovcik

[57] ABSTRACT

In a magnetic recording medium comprising a non-magnetic support and a magnetic recording layer coated thereon in which ferromagnetic particles are dispersed in a non-magnetic binder, the ferromagnetic particles are cubic particles of 0.3 or less micron and are subjected to an orientation treatment in the vertical direction to the recording surface, whereby the output and S/N ratio in a high density recording are increased.

11 Claims, No Drawings

MAGNETIC RECORDING MEDIUM

BACKGROUND OF THE INVENTION

1. Field of the Invention

This invention relates to a magnetic recording medium and more particularly, it is concerned with an improved magnetic recording medium having an S/N ratio increased in high density recording.

2. Description of the Prior Art

Up to the present time, various trials have been made to increase the recording density of a magnetic tape (relative speed of tape and head/maximum frequency of recording signal) from the requirements as to the high fidelity in audio cassettes and the low speed in small-sized video tape recorders. In these trials, for example, it is proposed to increase the coercive force of a magnetic layer, to increase simultaneously the residual magnetization and coercive force as in metallic cassettes or to arrange a magnetic layer with a high coercive force as an upper layer to increase the output at a high recording density with preventing the output at a low recording density from lowering.

Lately the thought of vertical magnetization recording has been introduced to use effectively the residual magnetization component in the vertical direction to the surface of a magnetic recording medium. It is said that according to this vertical magnetization recording, the recording density as defined above becomes high, the output decrease due to self-demagnetization (decrease of the residual magnetization by a self-demagnetization field acting in a direction to negative the self-magnetization between N and S poles formed by the self residual magnetization, which is increased with the decrease of the distance between the N and S poles) is not so large if the recording wavelength is smaller than the thickness of a magnetic layer, and the high density recording is effective with a recording wavelength of 1–2 microns or less. As a medium for the vertical magnetization recording, there have been used at present materials capable of being readily magnetized in vertical direction, such as sputtered film of Co-Cr alloy.

In magnetic recording medium with magnetic layers of coating type, utilization of a slant or vertical magnetization component, not in parallel with the magnetic surface, has been proposed as described in, for example, U.S. Pat. Nos. 3,185,775 and 3,052,567 and Japanese Patent Publication No. 15203/1974. However, these methods have the drawbacks that the noise level is still high and the output is low.

Furthermore, cubic particles with a relatively large diameter, for example, of Co-doped magnetite or $\gamma$-$Fe_2O_3$ obtained by the oxidation thereof have been used, but of late, they have not been used since the noise level is low but output is low.

SUMMARY OF THE INVENTION

It is an object of the present invention to provide a magnetic recording medium whereby the above described drawbacks of the prior art can be overcome.

It is another object of the present invention to provide a magnetic recording medium using cubic particles with the feature that the noise level is low in a short wavelength recording.

It is a further object of the present invention to provide a magnetic recording medium having an increased output and increased S/N ratio in a high density recording.

These objects can be attained by a magnetic recording medium comprising a non-magnetic support and a magnetic recording layer coated thereon in which ferromagnetic particles are disperesed in a non-magnetic binder, characterized in that the ferromagnetic particles are cubic particles of 0.3 micron or less and are subjected to an orientation treatment in the vertical direction to the recording surface.

DETAILED DESCRIPTION OF THE INVENTION

The present invention aims at increasing the output and S/N ratio with holding the feature of cubic particles that the noise level is low in a short wavelength recording. That is, this object can be accomplished by using finer cubic particles than in the prior art and subjecting them to an orientation treatment in a magnetic field vertical to a recording surface.

Accordingly, in a magnetic recording medium comprising a non-magnetic support and a magnetic recording layer coated thereon in which ferromagnetic particles are dispersed in a non-magnetic binder, the feature of the present invention consists in that the ferromagnetic particles are cubic particles with a particle size of 0.3 micron or less and are subjected to an orientation treatment in a magnetic field in the vertical direction to the recording surface.

As a material for the cubic ferromagnetic fine powder, there are used ordinary ferromagnetic fine powders of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$ ($FeO_x$: $1.33 < x < 1.50$), Co-doped Berthollide compounds of $\gamma$-$Fe_2O_3$ and $Fe_3O_4$ ($FeO_x$: $1.33 < x < 1.50$), $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

The ferromagnetic cubic particles used in the present invention have a particle size of at most 0.3 microns and are generally prepared as follows:

(1) A solution of ferrous or ferric ion is boiled in a strong alkali to precipitate magnetite and this precipitate, optionally after washed with water and dried, is dried at about 200° C. in an inert gas or air. During the same time, a part of the ferrous ion can be replaced by Co ion to raise the coercive force.

(2) To ferrous ion is added an alkali in an amount of at least equivalent to neutralization and boiled with blowing air therein or with adding an oxidizing agent such as nitrate thereto to obtain magnetite. Replacement by Co and heat treatment can be carried out in an analogous manner to the above described procedure 1).

(3) The iron oxides obtained by the procedures (1) and (2) are reduced with hydrogen to obtain metallic powders.

(4) Iron, cobalt, nickel or its alloy powder is vaporized and condensed in a low vacuum or a solution of a salt of iron, cobalt or nickel is reduced with sodium borohydride or hypophosphite to form an alloy powder, which is then heated in an inert gas to improve the property.

(5) Barium ferrite is finely ground and subjected to elutriation to obtain a fine powder with a particle size of about 0.3 micron or less, or Ba ion and Fe ion are coprecipitated and subjected to a hydrothermal treatment to obtain fine single crystals of ferrite. In this case, Ba ion can be replaced by another metal ion to lower the coercive force.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 1794/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, epoxy-polyamide resins, mixtures of high molecular weight polyester resins and isocyanate prepolymers, mixtures of methacrylic acid salt copolymer and diisocyanate prepolymers, mixtures of polyesterpolyols and polyisocyanates, ure-formaldehyde resins, mixtures of low molecular weight glycols, high molecular weight diols and triphenylmethane triisocyanates, polyamide resins and mixtures thereof, etc. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972 and 28922/1972, U.S. Pat. Nos. 3,144,353, 3,320,090, 3,437,510, 3,597,273, 3,781,210 and 3,781,211, etc. These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

In addition to the above described binder and ferromagnetic fine powder, other additives such as dispersing agents, lubricants, abrasives, antistatic agents and the like can be added to the magnetic recording layer.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils, carbon black, graphite, carbon black graft polymers, molybdenum disulfide, tungsten disulfide, fatty acid esters produced from a monocarboxylic acid containing about 12 to 16 carbon atoms and a monohydric alcohol containing about 3 to 12 carbon atoms, fatty acid esters produced from a monocarboxylic fatty acid containing about 17 or more carbon atoms and a monohydric alcohol in which the total number of carbon atoms ranges from about 21 to 23 and the like. These lubricants are generally used in a proportion of about 0.2 to 20 parts by weight per 100 parts by weight of a binder. These lubricants are described in Japanese Patent Publication No. 23889/1968, Japanese patent application Nos. 28647/1967 and 81543/1968, U.S. Pat. Nos. 3,470,021, 3,492,235, 3,497,411, 3,523,086, 3,625,760, 3,630,772, 3,634,253, 3,642,539 and 3,687,725, IBM Technical Disclosure Bulletin, Vol. 9, No. 7, page 779 (December 1966), and ELECTRONIK, No. 12, page 380 (1961), West Germany.

Typical abrasive agents which can be used in the present invention include fused alumina, silicon carbide, chromium oxide, corundum, diamond, synthetic diamond, garnet, emery (main component: corundum and magnetite) and the like. These abrasive agents have generally a mean particle size of 0.05 to 5 microns, preferably 0.1 to 2 microns and are generally added in a proportion of 1 to 10 parts by weight to 100 parts by weight of the magnetic powder. Examples of the abrasives are described in Japanese patent application No. 26749/1973, U.S. Pat. Nos. 3,007,807, 3,041,196, 3,293,066, 3,630,910 and 3,687,725, British Pat. No. 1,145,349, West German Pat. Nos. 853,211 and 1,001,000.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as heterocyclic compounds, e.g. higher alkylamines, quaternary ammonium salts, pyridine and the like; phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphates of amino acids, amino sulfonic acid, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to so no Oyo (Synthesis of Surface Active Agents and Their Applications), Maki Shoten, Tokyo (1964), A. M. Schwrats et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran (Handbook of Surface Active Agents)", 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

Formation of a magnetic recording layer is carried out by dissolving or dispersing the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc., and non-magnetic metals, for example, copper, aluminum, zinc, etc. Such a nonmagnetic support can have a thickness of about 3 to 100 microns, preferably 5 to 50 microns in the form of a film or sheet.

The above described magnetic powder, binder, dispersing agent, lubricant, abrasive agent, antistatic agent and solvent are well blended or kneaded to prepare a coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition. Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed impact mills, kneaders, high speed mixers, homogenizers, ultrasonic dispersing machines, etc. The kneading and techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in "Coating Kogaku (Coating Engineering)", page 253 to 277, Published by Asakura Shoten, Tokyo (Mar. 20, 1971).

Typical organic solvents which can be used in the coating include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrachloride, chloroform, ethylene chlorohydrin, dichlorobenzene and the like; etc.

The thickness of the magnetic layer is preferably determined so that the thickness be approximately a recording wavelength and the self-demagnetization be prevented when there is residual magnetization in the vertical direction and it is generally 0.1 to 10 microns, preferably 0.2 to 5 microns.

In the present invention, the magnetic orientation treatment of ferromagnetic particles in the vertical direction to a recording surface is effectively carried out in a DC magnetic field by a permanent magnetic, electromagnetic or solenoid optionally with superposing an AC magnetic field or with using jointly ultrasonic wave.

The thus obtained magnetic recording medium can exhibit a high output and a low noise within a range of short wavelength such as 1 micron, thus giving an excellent S/N ratio, as described in Examples.

The present invention will be explained in detail with reference to the following examples. It will be obvious to those skill in the art that various changes and modifications can be made in the components, ratios, operational order and the like without departing from the spirit of the present invention. Therefore, the present invention should not be construed as being limited to the following examples.

EXAMPLE

A magnetic powder A of Co-doped $\gamma$-$Fe_2O_3$ having one side of $0.2\mu$ and a coercive force of 900 Oe was prepared by the foregoing procedure (2).

A magnetic powder B having one side of $0.08\mu$ and a coercive force of 903 Oe was prepared by subjecting the iron particles obtained by reducing with sodium borohydride in the foregoing procedure (4) to a treatment at 200° C. in nitrogen.

A magnetic powder C of Co-doped $\gamma$-$Fe_2O_3$ having a longer diameter of $0.4\mu$ with a length/width ratio of 12 and a coercive force of 905 Oe was prepared for comparison.

Using these magnetic powders, coating liquids were prepared according to the following recipes:

|  | parts by weight |
|---|---|
| Magnetic Powders A, C | 100 |
| B | 150 |
| Vinyl Chloride-Vinyl Acetate Copolymer | 15 |
| Epoxy Resin | 7 |
| Polyamide Resin | 5 |
| Carbon Black | 7 |
| Silicone Oil | 1 |

| | parts by weight |
|---|---|
| Amyl Stearate | 0.2 |
| Methyl Ethyl Ketone | 180 |

These components were ball milled and well dispersed, coated onto a polyester base with a thickness of 22μ to give a coating thickness of 5μ on dry base, dried in a vertical magnetic field of 650 Gauss until substantially solidified and then completely dried without a magnetic field. On the other hand, using the above described three magnetic powders, coating was carried out without a treatment in a magnetic field. The thus coated films were respectively subjected to a calendering treatment and slit in a width of ½" thus obtaining Sample Nos. 1, 2 and 3, and 1', 2' and 3' corresponding to the order of the magnetic powders A, B and C. These samples were subjected to measurement the output and noise level in a short wavelength recording to obtain results as shown in Table 1.

In the short wavelength recording, the output and noise level at a recording wavelength of 0.5μ were measured by a VTR of helical type. The measurement of the ratio (short wavelength C/N ratio) of the output when a sine wave signal of 6 MHz was recorded and then reproduced by using a Sendust head with a head gap of 0.15μ as a head in a short wavelength range and a head and tape relative speed of 2.9 m/sec to the noise level at a point apart by 1 MHz from the reproduction output (short wavelength output). In any of the measurements, the results are shown by a deviation (dB) from that of Sample No. 3 used as a standard in Table 1:

TABLE 1

| | Magnetic Powder | Short Wavelength Output | Short Wavelength C/N Ratio |
|---|---|---|---|
| Magnetic Field Treatment | | | |
| Sample No. 1 | A | +5.0 | +5.5 |
| Sample No. 2 | B | +7.2 | +6.2 |
| Sample No. 3 | C | 0 | 0 |
| Magnetic Field Free Treatment | | | |
| Sample No. 1' | A | +3.7 | +4.8 |
| Sample No. 2' | B | +5.9 | +5.1 |
| Sample No. 3' | C | −0.2 | −0.1 |

As is evident from Table 1, Sample Nos. 1 and 2 obtained by subjecting cubic magnetic powders A and B to a treatment in a magnetic field in vertical direction according to the present invention are superior to Sample No. 3 using the prior art acicular particles with a large particle size in the output in short wavelength as well as the C/N ratio in short wavelength, and can also be compared favourably with Sample Nos. 1', 2' and 3' free from the treatment in a magnetic field in vertical direction to the surface with respect to the above described properties. It will clearly be understood from these results that the use of a fine and cubic magnetic powder and the joint use of an orientation treatment in the vertical direction to the surface during coating are more effective.

What is claimed is:

1. A magnetic recording medium having a high signal-to-noise ratio in high density recording and a low noise level in short wavelength recording and comprising a non-magnetic support and a magnetic recording layer coated directly thereon, the magnetic recording layer comprising ferromagnetic particles dispersed in a non-magnetic binder, wherein the ferromagnetic particles are cubic particles of at most 0.3 micron and are subjected to a magnetic orientation treatment in the vertical direction to the recording surface.

2. The magnetic recording medium of claim 1, wherein the ferromagnetic particles are selected from the group consisting of particles of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$, Co-doped Berthollide compounds of $\gamma$-$Fe_2O_3$ and $Fe_3O_4$, $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

3. The magnetic recording medium of claim 1, wherein the ferromagnetic particles are prepared by boiling a solution of ferrous or ferric ion in a strong alkali to precipitate magnetite and drying at 200° C. in an inert gas or air.

4. The magnetic recording medium of claim 1, wherein the ferromagnetic particles are prepared by adding an alkali in an amount of at least equivalent to neutralization to ferrous ion, boiling with blowing air therein or adding an oxidizer thereto and then drying at 200° C. in an inert gas or air.

5. The magnetic recording medium of claim 3 or 4, wherein the iron oxide is reduced with hydrogen to obtain a metallic powder.

6. The magnetic recording medium of claim 1, wherein the ferromagnetic particles are prepared by subjecting to a heat treatment in an inert gas a metallic powder obtained by vaporizing and condensing iron, cobalt, nickel or alloys thereof in a low vacuum or by reducing a solution of a salt of iron, cobalt or nickel with sodium borohydride or hypophosphite.

7. The magnetic recording medium of claim 1, wherein the mixing ratio of the ferromagnetic particles and binder is 100 to 200 parts by weight of the binder to 100 parts by weight of the ferromagnetic particles.

8. The magnetic recording medium of claim 1, wherein the magnetic recording layer has a thickness of 0.1 to 10 microns.

9. The magnetic recording medium of claim 1, wherein the orientation treatment is carried out in a magnetic field in the vertical direction to the recording surface.

10. The magnetic recording medium of claim 9, wherein the magnetic field is a DC field or AC field.

11. The magnetic recording medium of claim 10, wherein the magnetic field has a field strength of 500 to 5,000 gauss.

* * * * *